(12) United States Patent
Nakamura et al.

(10) Patent No.: US 9,721,392 B2
(45) Date of Patent: Aug. 1, 2017

(54) SERVER, CLIENT TERMINAL, SYSTEM, AND PROGRAM FOR PRESENTING LANDSCAPES

(71) Applicant: c/o SONY CORPORATION, Tokyo (JP)

(72) Inventors: Takatoshi Nakamura, Kanagawa (JP); Yoichiro Sako, Tokyo (JP); Mitsuru Takehara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/049,006

(22) Filed: Feb. 19, 2016

(65) Prior Publication Data

US 2016/0171781 A1    Jun. 16, 2016

Related U.S. Application Data

(63) Continuation of application No. 13/748,870, filed on Jan. 24, 2013, now Pat. No. 9,269,191.

(30) Foreign Application Priority Data

Feb. 8, 2012   (JP) .................................. 2012-025087

(51) Int. Cl.
*G06T 19/00* (2011.01)
*G06F 17/30* (2006.01)

(52) U.S. Cl.
CPC ...... *G06T 19/006* (2013.01); *G06F 17/30256* (2013.01); *G06F 17/30265* (2013.01)

(58) Field of Classification Search
CPC ............. G06T 19/006; G06F 17/30265; G06F 17/30256
See application file for complete search history.

(56) References Cited

U.S. PATENT DOCUMENTS

| | | | |
|---|---|---|---|
| 8,810,599 B1 * | 8/2014 | Tseng ................... | G06T 7/0018 340/435 |
| 2012/0127201 A1 * | 5/2012 | Kim ....................... | G09G 5/377 345/633 |

FOREIGN PATENT DOCUMENTS

CN         102067164 A      5/2011

OTHER PUBLICATIONS

Bane, Ryan, and Tobias Höllerer. ISMAR 2004: Proceedings of the Third IEEE and ACM International Symposium on Mixed and Augmented Reality: Nov. 2-5, Arlington, VA, USA. Los Alamitos, CA: IEEE Computer Society, 2004. Print. pp. 1-9.*

(Continued)

*Primary Examiner* — Robert Craddock
(74) *Attorney, Agent, or Firm* — Chip Law Group

(57) ABSTRACT

There is provided a server including a reception unit configured to receive, from a client terminal, position information indicating a position of the client terminal, and direction information indicating a direction in which the client terminal is directed, and a search unit configured to search for image data provided with position information indicating an opposite position across a target object present in the direction indicated by the direction information with respect to the position of the client terminal based on the position information.

17 Claims, 12 Drawing Sheets

(56) References Cited

OTHER PUBLICATIONS

Avery et al., Improving Spatial Perception for Augmented Reality X-Ray Vision, IEEE Virtual Reality 2009, Mar. 18, 2009, 79-82.*
Avery et al., Improving Spatial Perception for Augmented Reality X-Ray Vision, Mar. 14, 2009, IEEE Virtual Reality 2009, pp. 79-82.*
Office Action for CN Patent Application No. 201310040719.3, issued on Dec. 19, 2016, 5 pages of Office Action and 11 pages of English Translation.

* cited by examiner

FIG. 3

| POSITION INFORMATION | DIRECTION INFORMATION | IMAGE DATA |
|---|---|---|
| P1 | D1-1 | I1-1 |
| P1 | D1-2 | I1-2 |
| P2 | D2-1 | I2-1 |
| ... | ... | ... |

FIG. 7
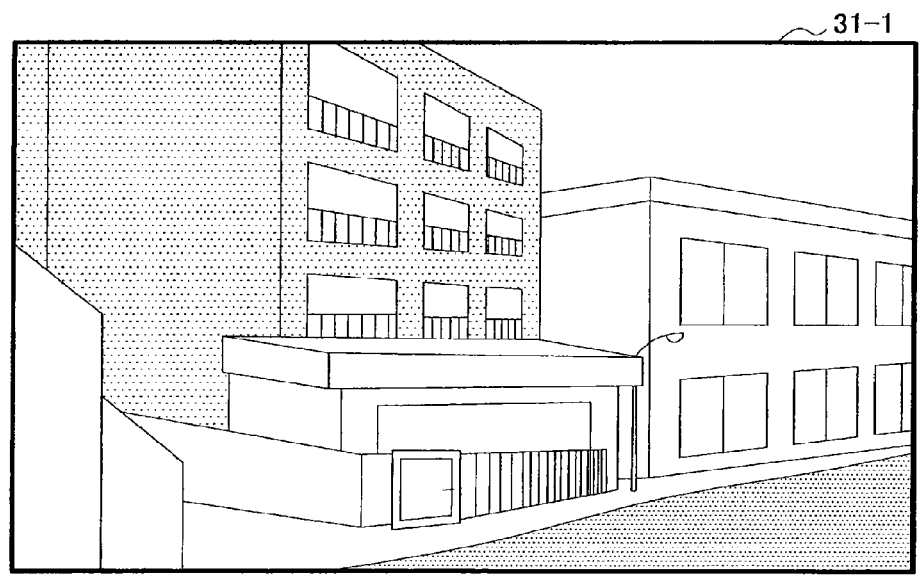
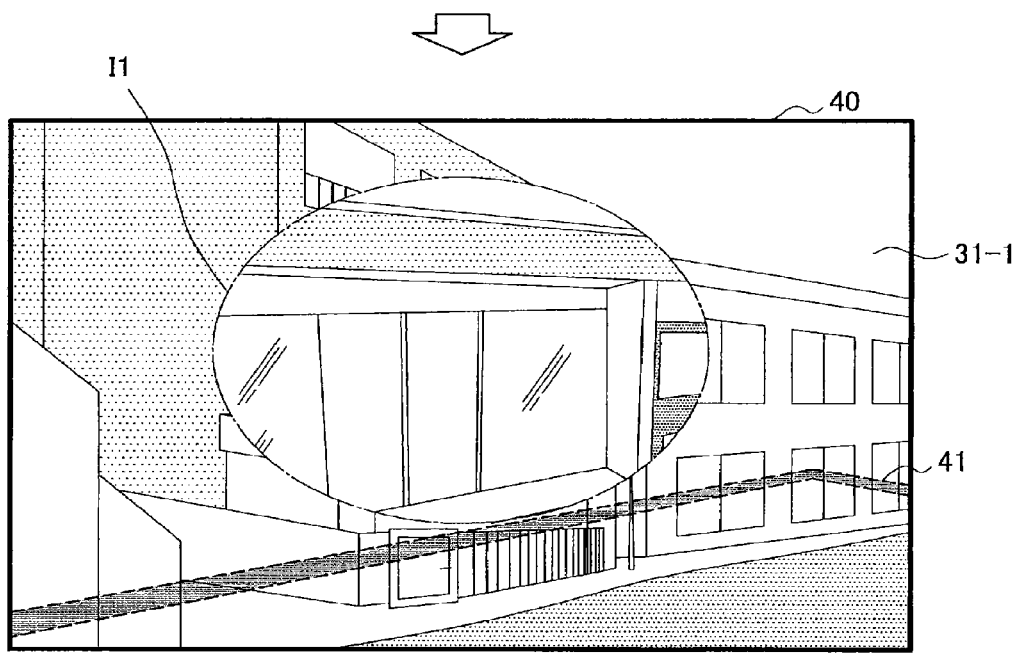

SERVER, CLIENT TERMINAL, SYSTEM, AND PROGRAM FOR PRESENTING LANDSCAPES

BACKGROUND

The present disclosure relates to a server, a client terminal, a system, and a program.

Recently, digital cameras that store and save a subject image as a digital image signal in a storage medium have been spread. These digital cameras record and save an image when the image is displayed on a viewfinder.

On the other hand, in JP 2006-260338A, a digital camera capable of acquiring a past or future image of a specific target image is proposed. Specifically, when a user has specified a past date, the digital camera described in JP 2006-260338A uploads the specified date, position information of the digital camera, and the like to a server and acquires a corresponding past image from the server. The digital camera displays the acquired past image when a shutter button is pressed.

SUMMARY

Thus, the digital camera described in JP 2006-260338A described above displays a past/future image of a currently viewed landscape, thereby enabling the user to experience virtual time travel.

On the other hand, generally when a zoom operation is performed in the digital camera, a display can be performed as if approaching a remote landscape according to a telescopic function, but it is difficult to display optically invisible landscapes such as landscapes on an opposite side of a subject. However, a user who has lost his/her way or is looking for a peripheral shop wants to see a street on an opposite side by skipping an obstacle (subject) such as a building in front of him/her.

It is desirable to provide a novel and improved server, client terminal, system, and program capable of presenting landscapes on an opposite side of a target object in a direction in which a client terminal is directed.

According to an embodiment of the present disclosure, there is provided a server including a reception unit configured to receive, from a client terminal, position information indicating a position of the client terminal, and direction information indicating a direction in which the client terminal is directed, and a search unit configured to search for image data provided with position information indicating an opposite position across a target object present in the direction indicated by the direction information with respect to the position of the client terminal based on the position information.

According to an embodiment of the present disclosure, there is provided a client terminal including a transmission unit configured to transmit, to a server, position information indicating a position of the client terminal, and direction information indicating a direction in which the client terminal is directed, and a reception unit configured to receive, from the server, image data provided with position information indicating an opposite position across a target object present in the direction indicated by the direction information with respect to the position of the client terminal based on the position information.

According to an embodiment of the present disclosure, there is provided a system including an acquisition unit configured to acquire position information indicating a position of a client terminal, and direction information indicating a direction in which the client terminal is directed, and a search unit configured to search for image data provided with position information indicating an opposite position across a target object present in the direction, which is indicated by the direction information, in which the client terminal is directed with respect to the position of the client terminal indicated by the position information.

According to an embodiment of the present disclosure, there is provided a recording medium having a program recorded thereon, the program being configured to cause a computer to execute the processes of receiving, from a client terminal, position information indicating a position of the client terminal, and direction information indicating a direction in which the client terminal is directed, and searching for image data provided with position information indicating an opposite position across a target object present in the direction indicated by the direction information with respect to the position of the client terminal based on the position information.

According to an embodiment of the present disclosure, there is provided a recording medium having a program recorded thereon, the program being configured to cause a computer to execute the processes of transmitting, to a server, position information indicating a position of a client terminal, and direction information indicating a direction in which the client terminal is directed, and receiving, from the server, image data provided with position information indicating an opposite position across a target object in the direction indicated by the direction information with respect to the position of the client terminal based on the position information.

According to an embodiment of the present disclosure, there is provided a recording medium having a program recorded thereon, the program being configured to cause a computer to execute the processes of acquiring position information indicating a position of a client terminal, and direction information indicating a direction in which the client terminal is directed, and searching for image data provided with position information indicating an opposite position across a target object present in the direction, which is indicated by the direction information, in which the client terminal is directed with respect to the position of the client terminal indicated by the position information.

According to the embodiments of the present disclosure described above, it is possible to present landscapes on an opposite side of a target object in a direction in which a client terminal is directed.

BRIEF DESCRIPTION OF THE DRAWINGS

FIG. 3 is a diagram illustrating an example of data stored in an image database (DB);

FIG. 7 is a diagram illustrating display example 1 of a skip zoom in accordance with this embodiment;

DETAILED DESCRIPTION OF THE EMBODIMENT(S)

Figure 1:
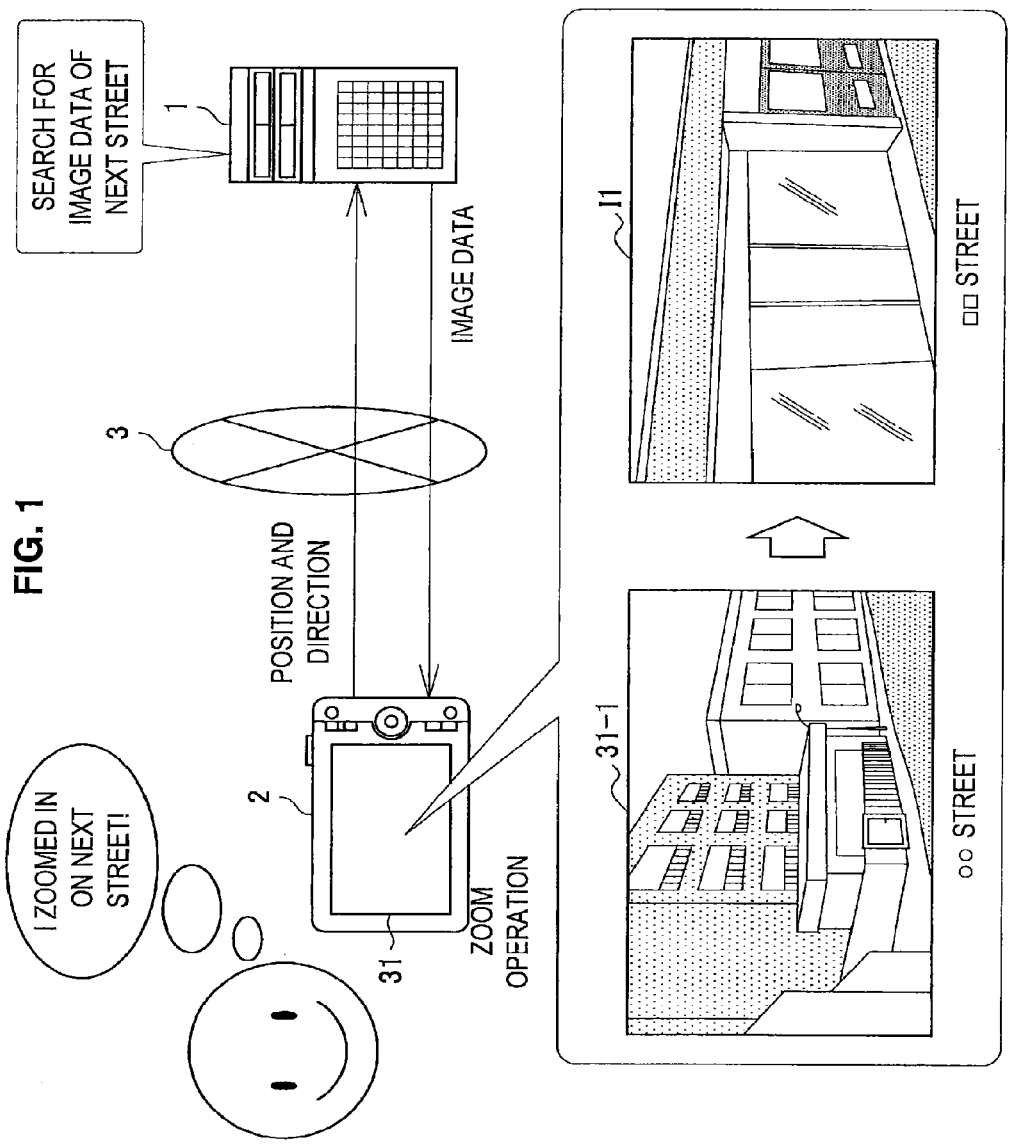
FIG. 1 is a diagram illustrating an outline of a skip zoom system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.

1. Outline of Skip Zoom System in Accordance with Embodiment of Present Disclosure
2. Basic Configuration
2-1. Server
2-2. Digital Camera
3. Display Control
4. Skip Zoom Systems in Accordance with Other Embodiments
5. Summary <1. Outline of Skip Zoom System in Accordance with Embodiment of Present Disclosure>

First, the outline of the skip zoom system in accordance with the embodiment of the present disclosure will be described with reference to FIG. 1. As illustrated in FIG. 1, the skip zoom system in accordance with the embodiment of the present disclosure has a server 1 and a digital camera 2 (a client terminal). In addition, the server 1 and the digital camera 2 are connectable via a network 3.

Here, when the normal digital camera has performed the zoom operation, an image approaching a subject is displayed according to a telescopic function of optically changing a focal length. However, it is difficult to display optically invisible landscapes such as landscapes on an opposite side of the subject in the normal telescopic function. In addition, even in a digital zoom that enlarges part of the captured image, it is difficult to reproduce landscapes (optically invisible landscapes) on an opposite side of a subject not originally imaged in the captured image.

In accordance with an embodiment of the present disclosure, image data with position information indicating an opposite position across a target object in a direction in which the client terminal is directed is displayed according to the zoom operation. Thereby, the user can view a street on an opposite side of a building in a sense as if the street on the opposite side were zoomed in on by skipping the building located immediately ahead.

For example, if the digital camera 2 images a building immediately ahead when the user is on "○○ Street," a captured image 31-1 of "○○ Street" viewed from a place in which the user is currently located is displayed on a display unit 31 as illustrated in FIG. 1. In addition, while the digital camera 2 displays the captured image 31-1 on the display unit 31, the digital camera 2 detects position information and direction information (for example, an imaging direction) of its own terminal, and transmits the detected position and direction information to the server 1.

The server 1 searches for image data with position information indicating an opposite position across the building in an imaging direction, for example, image data I1 of "□□ Street" on an opposite side of the building, based on the position and direction information received from the digital camera 2. Then, the server 1 transmits the searched image data to the digital camera 2.

When the user performs a skip zoom operation, the digital camera 2 displays the image data I1 of □□ Street on the opposite side in the imaging direction received from the server 1 on the display unit 31 as illustrated in FIG. 1. Thereby, when the user has lost his/her way or is looking for a peripheral shop, the user can check an appearance on the opposite side of the building in a direction in which the digital camera 2 is directed with no actual movement.

The outline of the skip zoom system in accordance with the embodiment of the present disclosure has been described above. Hereinafter, configurations of the server 1 and the digital camera 2 (a client terminal) included in the skip zoom system will be described in detail.

Although the digital camera 2 is illustrated as the client terminal in FIG. 1, the client terminal in accordance with this embodiment is not limited thereto, and may be, for example, a video camera, a camera-equipped smart phone, personal digital assistant (PDA), personal computer (PC), portable phone, portable music player apparatus, portable video processing apparatus, portable game device, telescope, or binoculars, or the like. In addition, the client terminal in accordance with this embodiment is not limited to a camera-equipped apparatus. For example, any apparatus capable of acquiring position information and/or direction information of its own apparatus such as an apparatus with a Global Positioning System (GPS) or direction sensor can be applied. Further, any apparatus in which position information and/or direction information of its own apparatus can be manually input can be applied even when there is no GPS or direction sensor.

<2. Basic Configuration>

[2-1. Server]

Figure 2:
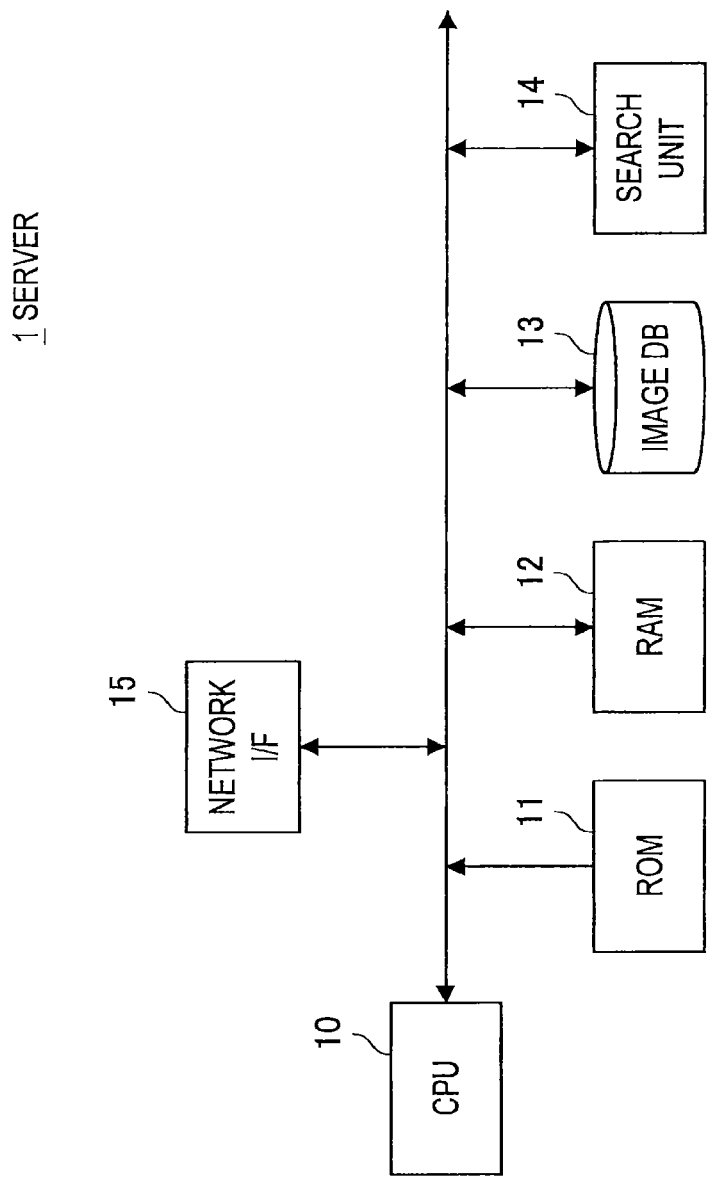
FIG. 2 is a block diagram illustrating a configuration of a server in accordance with an embodiment of the present disclosure.

FIG. 2 is a block diagram illustrating a configuration of the server 1 in accordance with an embodiment of the present disclosure. As illustrated in FIG. 2, the server 1 has a central processing unit (CPU) 10, a read only memory (ROM) 11, a random access memory (RAM) 12, an image database (DB) 13, a search unit 14, and a network interface (I/F) 15. Hereinafter, these elements will be described.

(Image DB 13)

The image DB 13 stores image data in association with information such as position information (for example, longitude/latitude and the like indicating an imaging point) and direction information (for example, an imaging direction). Here, an example of data stored by the image DB 13 is illustrated in FIG. 3.

As illustrated in FIG. 3, the image DB 13 in accordance with this embodiment stores the image data in a state in which the image data is associated with position information P, direction information D, and image data I (in a state in which the position information P and the direction information D are added to the image data I). In the example illustrated in FIG. 3, image data I1-1 captured in a direction D1-1 from a position P1, image data I1-2 captured in a different direction D1-2 from the same position P1, and the like are stored. Although an example in which the position information P and the direction information D are associated with the image data I has been described above, this embodiment is not limited thereto. Information on the altitude of the imaging point, an imaging date, an imaging time band, weather during imaging, and the like may be associated with the image data I. In addition, the image DB 13 may store thumbnail images for the image data I.

(Search Unit 14)

The search unit 14 searches for image data from among image data stored in the image DB 13 based on position information and direction information of the digital camera 2 received from the digital camera 2. Here, a specific search method by the search unit 14 will be described with reference to FIG. 4.

Figure 4:
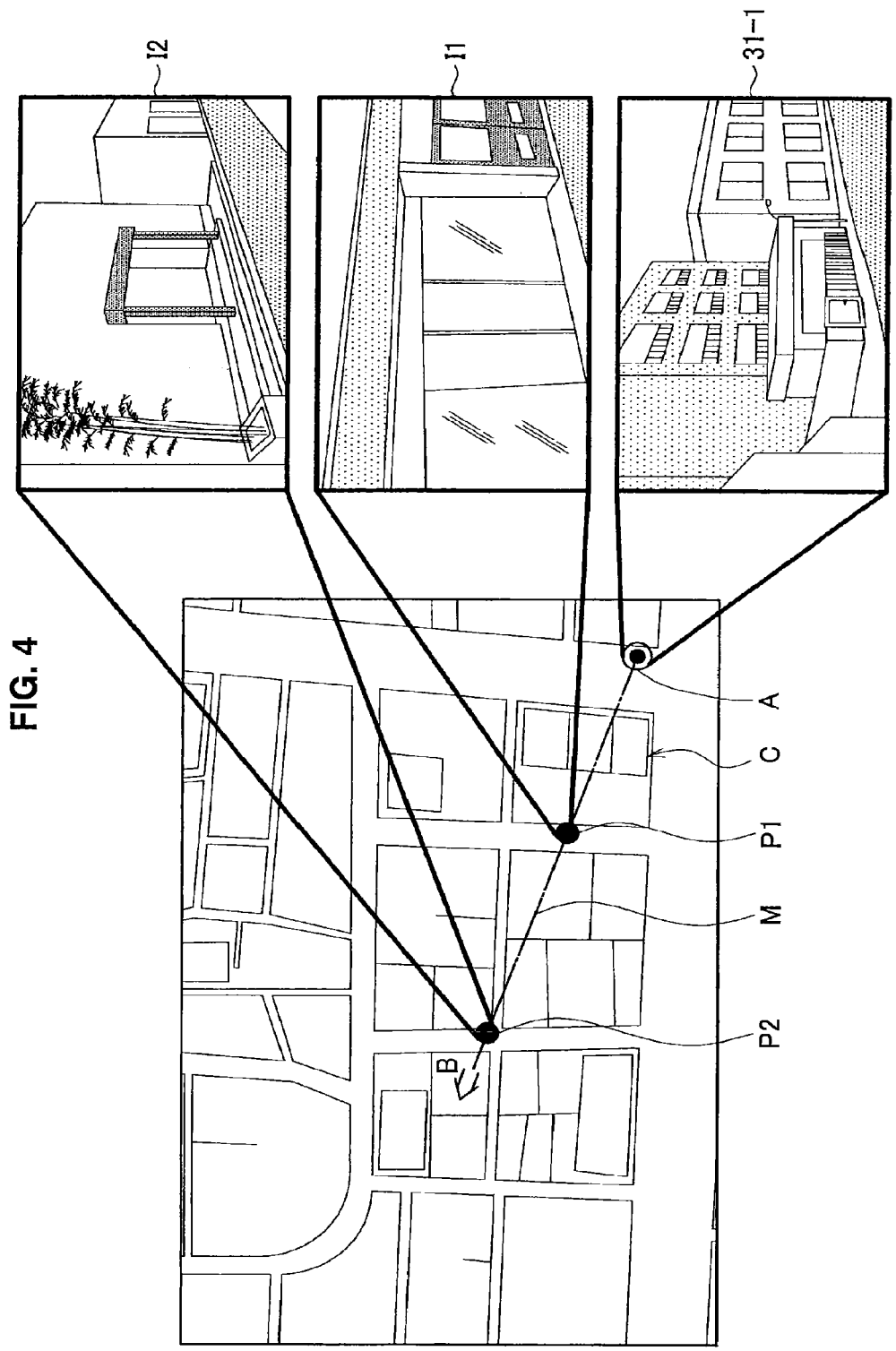
FIG. 4 is a diagram illustrating a search of image data corresponding to a position and direction of a digital camera.

FIG. 4 is a diagram illustrating a search of image data corresponding to positions A and B of the digital camera 2. As illustrated in FIG. 4, the search unit 14 searches the image DB 13 for image data I1 with position information indicating an opposite position P1 across a building C in the direction B in the vicinity of an axis M extending in the direction B indicated by the direction information from the position A indicated by the received position information.

Here, the search unit 14 may determine the opposite position P1 across the building C based on the received position and direction information and map information stored in the ROM 11 in advance. In addition, the image data I1 with the position information indicating the opposite position P1 across the building C, for example, is image data obtained by imaging landscapes of one street across a street on which the user is currently located.

Further, the search unit 14 may search for image data with direction information indicating a direction substantially the same as the direction B in which the digital camera 2 is directed among image data with the position information indicating the position P1. Thereby, the user can check an appearance of an opposite side across a building in a direction in which the digital camera 2 is directed in a more realistic positional relationship.

Further, when information on an altitude, an angle of elevation, an imaging date, an imaging time band, weather during imaging, and the like of the digital camera 2 during imaging can be acquired, the search unit 14 may search for image data of a situation closer to a current situation in which the user captures an image based on the information.

(Network I/F 15)

The network I/F 15 is a communication module for transmitting/receiving data to/from the digital camera 2 over the network 3. For example, the network I/F 15 in accordance with this embodiment receives position information and direction information or transmits one or more image data searched by the search unit 14.

(CPU 10, ROM 11, and RAM 12)

The ROM 11 stores a software program or the like for searching for image data using the above-described search unit 14 or transmitting the searched image data to the digital camera 2 through the network I/F 15. The CPU 10 executes a process using the RAM 12 as a work area according to the above-described software program stored in the ROM 11.

[2-2. Digital Camera]

Figure 5:
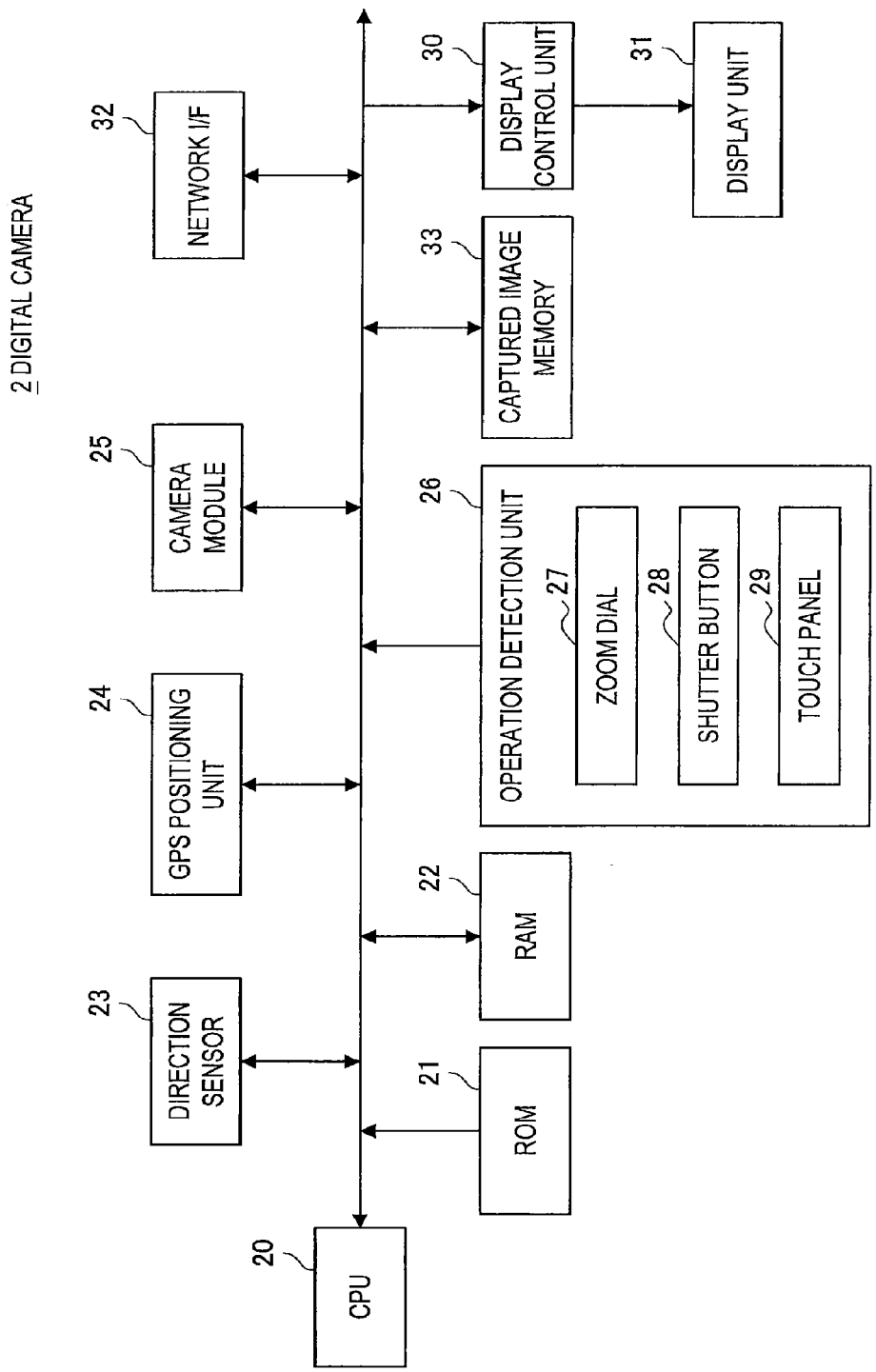
FIG. 5 is a block diagram illustrating a configuration of a digital camera in accordance with an embodiment of the present disclosure.

Next, a configuration of the digital camera 2 will be described with reference to FIG. 5. FIG. 5 is a block diagram illustrating the configuration of the digital camera 2 in accordance with this embodiment.

As illustrated in FIG. 5, the digital camera 2 has a CPU 20, a ROM 21, a RAM 22, a direction sensor 23, a GPS positioning unit 24, a camera module 25, an operation detection unit 26, a captured image memory 33, a display control unit 30, a display unit 31, and a network I/F 32. Hereinafter, these elements will be described.

The ROM 21 stores a program for transmitting position information and direction information to the server 1, acquiring image data searched from the server 1 based on the position information and the direction information, and displaying/recording the acquired image data in addition to a program for performing an imaging function. In addition, the CPU 20 executes the program stored in the ROM 21 using the RAM 22 as the work area.

The direction sensor 23 senses a direction of an optical axis of a lens optical system of the camera module 25, that is, an imaging direction, and outputs information (direction information) on the sensed imaging direction. Although the digital camera 2 having the camera module 25 as an example of the client terminal is included here, the client terminal in accordance with this embodiment is not limited to an apparatus with a camera as described above. In the case of the client terminal that does not have the camera, the direction sensor 23 may output a direction in which a specific portion of the client terminal is directed as direction information.

The GPS positioning unit 24 receives radio waves from a GPS satellite, senses a position at which the digital camera 2 is located, and outputs information on the sensed position. The GPS positioning unit 24 is an example of a position information acquisition unit that senses the position of the digital camera 2 based on a signal acquired from an outside. In addition, the position information acquisition unit may sense a position, for example, using wireless fidelity (Wi-Fi) communication, transmission/reception to/from a portable phone, a personal handy-phone system (PHS), or a smart phone, or near distance communication, or the like.

The camera module 25 includes an imaging element, an imaging optical system including an imaging lens, and a captured image signal processing unit, and outputs data of a captured image of a digital signal. The imaging element is implemented, for example, by a charge coupled device (CCD) imager or a complementary metal oxide semiconductor (CMOS) imager.

The operation detection unit 26 is a touch panel 29 or the like that detects an operation on a physical key group of a button, a switch, a dial, and the like or a key group displayed on the display unit 31 for detecting various operations by a user. The CPU 20 executes a process corresponding to the user's operation detected by the operation detection unit 26 according to the program of the ROM 21.

Here, a zoom dial 27, a shutter button 28, and the like are included as a key group for operating the camera. The zoom dial 27 is a dial for detecting a zoom operation. The detection of the zoom operation in accordance with this embodiment is not limited to the zoom dial 27 illustrated in FIG. 5. For example, an operation detection unit by other physical structures such as a zoom switch, a button, and the like may perform the detection. A zoom operation screen is displayed on the display unit 31 and an operation on the zoom operation screen may be detected by the touch panel 29.

The display control unit 30 controls a display of display content of a display screen displayed on the display unit 31 according to control by the CPU 20 based on the program of the ROM 21. Although the display control unit 30 controls the display unit 31 provided in the digital camera 2 in the examples illustrated in FIGS. 1 and 5, the display control unit 30 in accordance with this embodiment is not limited thereto, and may control a display in a connected external display apparatus.

In addition, the display control unit 30 in accordance with this embodiment controls image data with position information indicating an opposite position across a target object to be displayed according to the zoom operation. Further, the display control unit 30 in accordance with this embodiment has a function serving as a combining unit that combines image data to which the position information indicating the opposite position across the target object is added with an image captured by the camera module 25, and may control a display of a generated composite image. The display control of the display control unit 30 in accordance with this embodiment as described above will be described in detail in <3. Display Control>.

According to control of the display control unit 30, the display unit 31 displays an image of a subject output from the camera module 25 in real time in addition to a menu screen, various operation screens, and the like, or displays a captured image stored in the captured image memory 33.

Further, the display unit 31 is implemented, for example, by a liquid crystal display (LCD), an organic light-emitting diode (OLED), or the like. In addition, the display unit 31 in accordance with this embodiment displays remote image data received from the server 1.

The network I/F 32 is a communication module for performing data transmission/reception to/from the server 1 over the network 3. For example, the network I/F 32 in accordance with this embodiment transmits position information output from the GPS positioning unit 24 and direction information output from the direction sensor 23 or receives searched image data.

As the captured image memory 33, for example, a flash memory such as a card memory is used. In addition, the captured image memory 33 may be a recording medium such as a digital versatile disc (DVD). Further, the captured image memory 33 may be a hard disk apparatus instead of such a removable memory medium.

In addition, the captured image memory 33 may store an image of a subject continuously output from the camera module 25 as a captured image according to a timing of a shutter operation detected by the shutter button 28. In this case, the captured image memory 33 may record position information output from the GPS positioning unit 24, direction information output from the direction sensor 23, and the like together as meta-information.

The configuration of the digital camera 2 in accordance with an embodiment of the present disclosure has been in detail described above. Next, display control of image data corresponding to a zoom operation in accordance with this embodiment will be described with reference to FIG. 6.

<3. Display Control>

Figure 6:
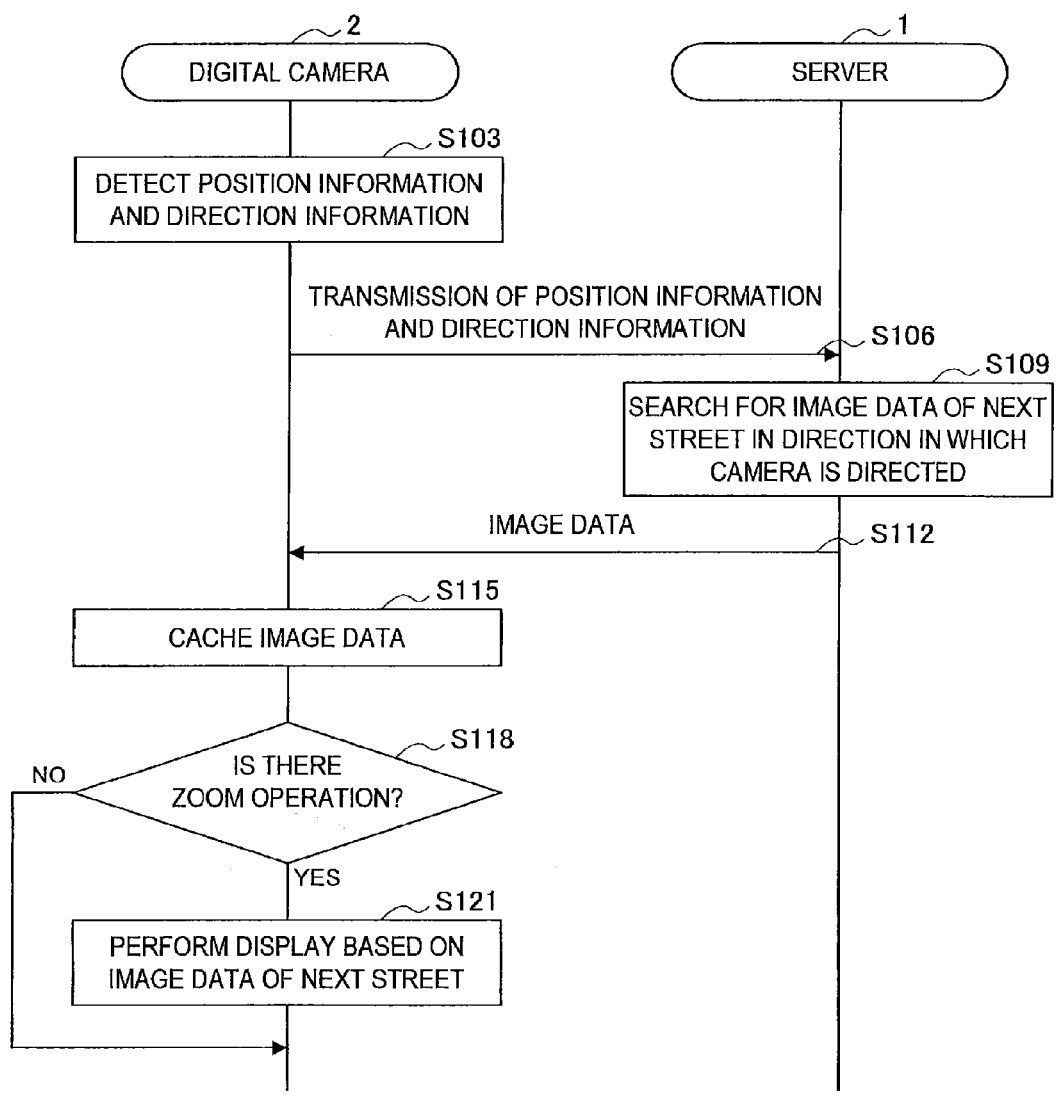
FIG. 6 is a sequence diagram illustrating a display control process in accordance with this embodiment.

FIG. 6 is a sequence diagram illustrating a display control process in accordance with this embodiment. As illustrated in FIG. 6, first, in step S103, the digital camera 2 detects direction information using the direction sensor 23 and detects position information using the GPS positioning unit 24.

Then, in step S106, the digital camera 2 transmits the position information and the direction information to the server 1.

Next, in step S109, the search unit 14 of the server 1 searches for image data with position information indicating an opposite position across a target object such as a building in a direction in which the digital camera 2 is directed based on received position and direction information. Here, the image data with the position information indicating the opposite position across the target object such as the building, for example, is image data of a street one street away.

Then, in step S112, the server 1 transmits one or more searched image data to the digital camera 2. Next, in step S115, the digital camera 2 temporarily stores (caches) the one or more image data received from the server 1.

Then, in step S118, the digital camera 2 determines whether or not a zoom operation (skip zoom operation) has been detected by the operation detection unit 26. Here, the skip zoom operation may be a zoom operation that is still continuously performed even after a zoom scale factor is increased to a limit in normal zoom imaging, a zoom operation that is performed in a skip zoom mode, an operation on a skip zoom screen, or the like.

Next, when the zoom operation (skip zoom operation) has been detected, the display control unit 30 of the digital camera 2 performs a display based on image data of the next street received from the server 1 in step S121. A display example of a skip zoom in accordance with this embodiment will be described later.

When the zoom operation has been performed at a position at which there is no image data, the digital camera 2 may provide notification indicating that there is no image data by performing an alarm display and may provide the user with notification indicating that there is no image data in advance.

The display control process of the skip zoom in accordance with this embodiment has been described above in detail. Next, display examples of the skip zoom in accordance with this embodiment will be specifically described with reference to the drawings.

(Display Example 1 of Skip Zoom)

FIG. 7 is a diagram illustrating display example 1 of the skip zoom in accordance with this embodiment. A captured image 31-1 illustrated in the upper side of NG 7 is an image output from the camera module 25 in real time and displayed on the display unit 31. In this case, when the zoom operation is detected by the operation detection unit 26, the display control unit 30 generates a composite image 40 obtained by combining image data I1 of a street one street away with the captured image 31-1 as illustrated in the lower side of FIG. 7, and controls the composite image 40 to be displayed on the display unit 31.

As illustrated in FIG. 7, in the composite image 40, a building imaged in the captured image 31-1 is transparent and the image data I1 of the next street is superimposed. In addition, the display control unit 30 combines the image data I1 of the next street in a position, a size, and the like by which the next street is viewable when the building is transparent. Thereby, the user can intuitively recognize a sense of spatial distance between a target object immediately ahead and the next street. In addition, as illustrated in the composite image 40 of FIG. 7, the user can more intuitively recognize the sense of spatial distance by displaying the next alley 41 superimposed on the captured image 31-1.

(Display Example 2 of Skip Zoom)

In the above-described display example 1, although a composite image obtained by combining a plurality of images is displayed, a display example of the skip zoom by the display control unit 30 in accordance with this embodiment is not limited to the above-described composite image. For example, the display control unit 30 may display only the image data I1 of the next street received from the server 1 as display example 2.

Figure 8:
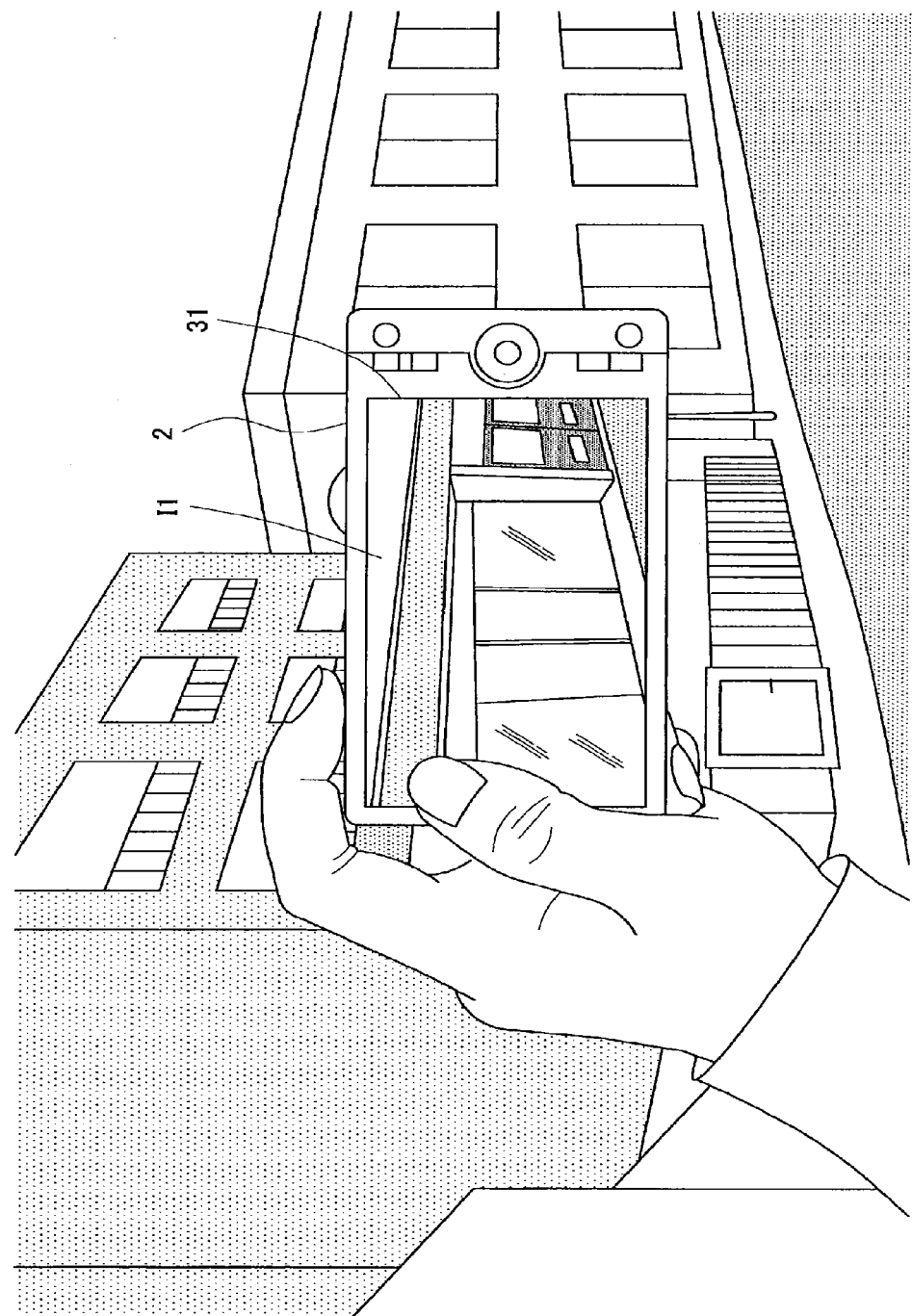
FIG. 8 is a diagram illustrating display example 2 of the skip zoom in accordance with this embodiment.

Here, display example 2 of the skip zoom in which only the image data I1 is displayed is illustrated in FIG. 8. As illustrated in FIG. 8, only the image data I1 of the next street received from the server 1 is displayed on the display unit 31 of the digital camera 2.

Thereby, the user can view the image data I1 displayed on the display unit 31 while comparing the image data I1 with the real world with the naked eye.

A plurality of display examples of the skip zoom in accordance with this embodiment have been described above. In a state in which the image data I1 of the next street is displayed on the display unit 31 according to the skip zoom, the display control unit 30 may control the display of image data according to the direction of the digital camera 2 when the user has changed the direction of the digital camera 2.

(Display Control Linked to Direction of Digital Camera 2)

Figure 9:
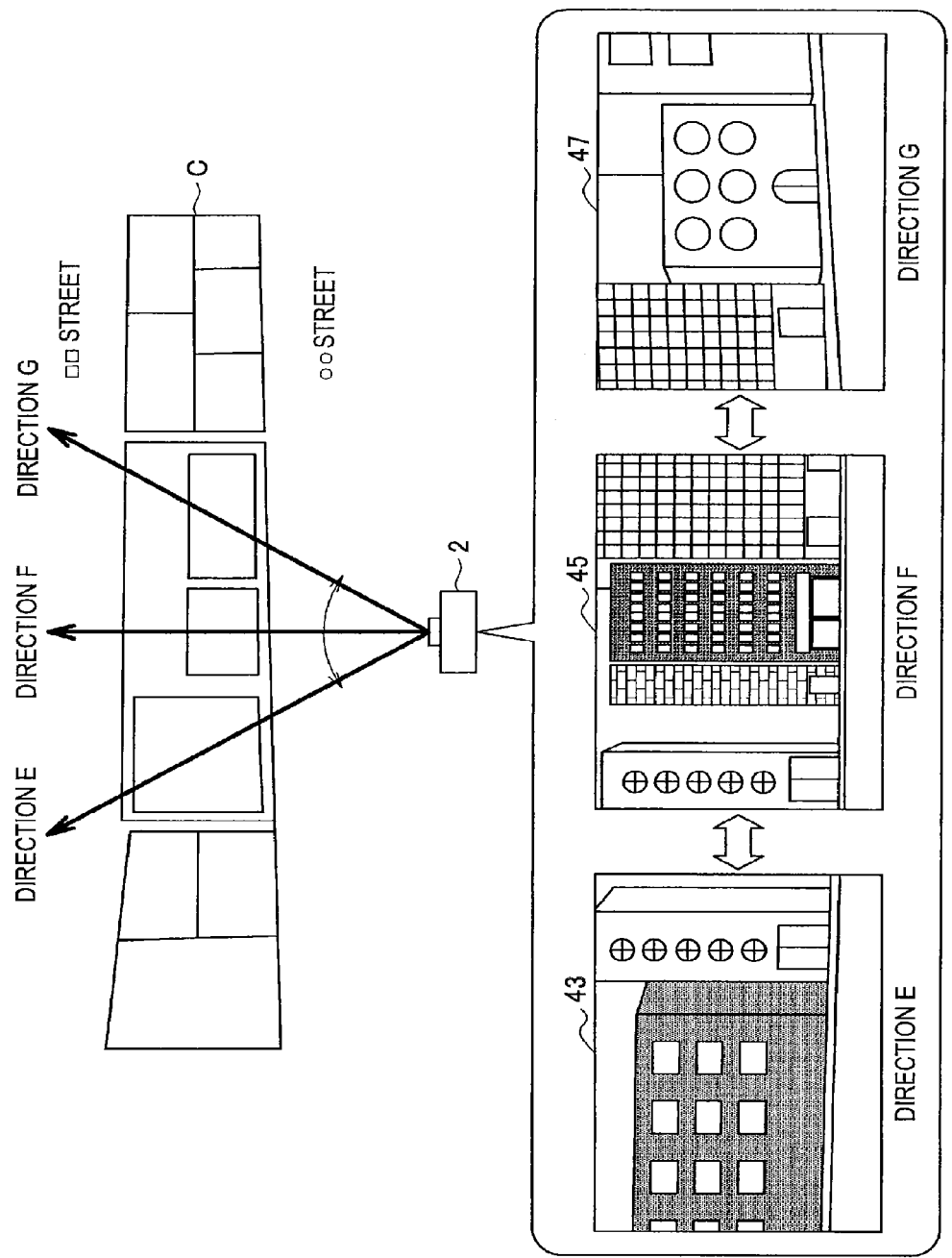
FIG. 9 is a diagram illustrating an example of display control of image data corresponding to a direction of the digital camera in accordance with this embodiment.

Here, an example of display control of the image data corresponding to the direction of the digital camera 2 will be described with reference to FIG. 9. As illustrated in FIG. 9, the display control unit 30 of the digital camera 2 displays images 43, 45, and 47 of an opposite side of a building C from substantially the same direction, that is, "□□ Street," which is one street away, according to directions (directions E, F, G, and the like).

Figure 10:
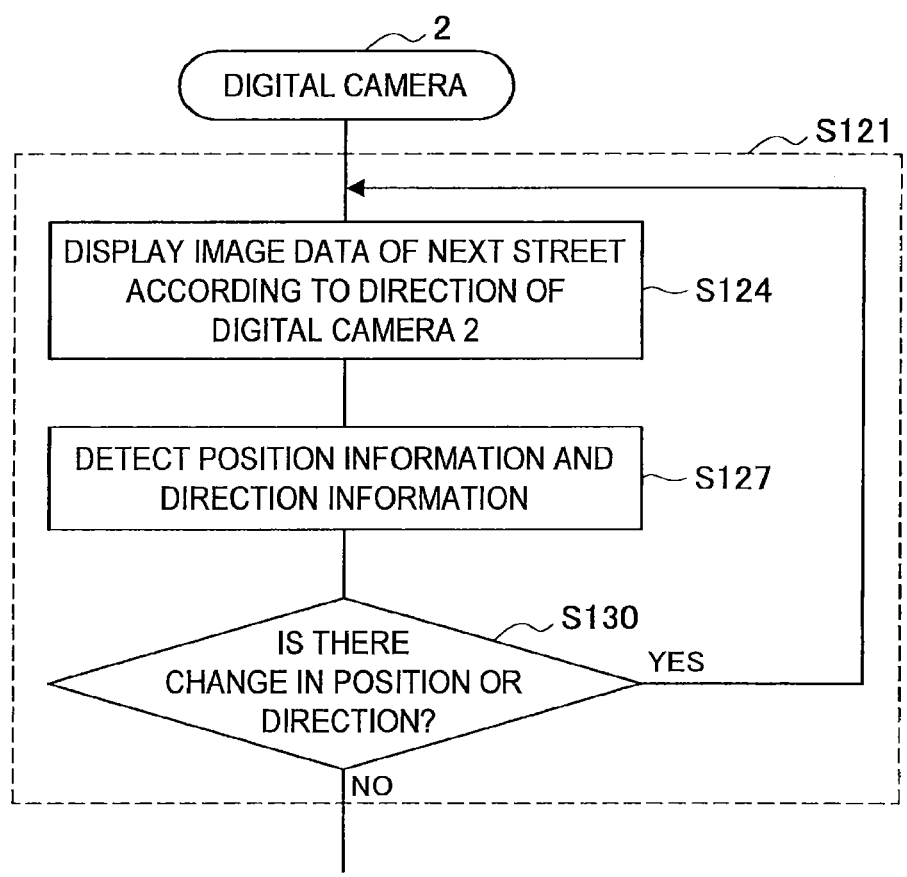
FIG. 10 is a flowchart illustrating a display control process corresponding to a change in a direction of a digital camera 2 in accordance with this embodiment.

More specifically, the digital camera 2 can perform display control corresponding to the direction of the digital camera 2 by continuously performing a process illustrated in FIG. 10, for example, as a display based on image data illustrated in step S121 of FIG. 6. Here, FIG. 10 is a flowchart illustrating a display control process corresponding to a change in the direction of the digital camera 2 in accordance with this embodiment.

In step S124 of FIG. 10, the digital camera 2 displays image data of the next street received from the server 1 according to a position and direction of the digital camera 2. Then, when position and direction information of the digital camera 2 is detected in step S127, the CPU 20 determines whether or not there is a change in the detected position or direction in step S130.

When the CPU 20 determines that there is a change in the position or direction of the digital camera 2 in the above-described step S130, the process returns to step S124, and the display control unit 30 displays image data of the next street according to a changed position or direction.

As described above, even when the user has changed the position or direction of the digital camera 2 by continuously performing the process of steps S124 to S130, the digital camera 2 can perform display control corresponding to the change. Thereby, it is possible to provide the user with a sense in which the appearance of the next street (an opposite side of a building C) is transparently viewed in real time.

The images 43 to 47 displayed according to the direction of the digital camera 2 illustrated in FIG. 9 may be included in a plurality of image data of the next street received from the server 1 in advance in step S112 illustrated in FIG. 6.

In addition, when the position or direction is determined to be changed in step S130 illustrated in FIG. 9 described above, the images 43 to 47 may be image data received by the digital camera 2 from the server 1 according to substantially the same process as in steps S106 to S112 in FIG. 6 described above.

Alternatively, the display control unit 30 may generate and display the images 43 to 47 corresponding to the position and direction of the digital camera 2 based on the image data received from the server 1.

(Display Switching Control)

Next, display control when the display control unit 30 in accordance with this embodiment switches a display target to the image data I1 of the next street according to a zoom operation will be described. When switching from a screen currently displayed on the display unit 31 to a screen of only the composite image 40 illustrated in FIG. 7 or the image data I1 illustrated in FIG. 8 is performed according to the zoom operation, the display control unit 30 may add a transition effect such as gradual enlargement of the image data I1. In addition, the display control unit 30 may change a speed or type of transition effect according to a distance (a distance between a position of the digital camera 2 and a position indicated by position information added to image data to be switched) to be skipped.

<4. Skip Zoom Systems in Accordance with Other Embodiments>

As described above, in the skip zoom system in accordance with the embodiment of the present disclosure, the display control unit 30 (a combining unit) of the digital camera 2 can combine searched image data received from the server 1 with a captured image (see FIG. 7). However, the combining of image data in accordance with this embodiment is not limited to a process by the display control unit 30. For example, as illustrated in FIG. 11, a combining process may be performed on the server side.

Figure 11:
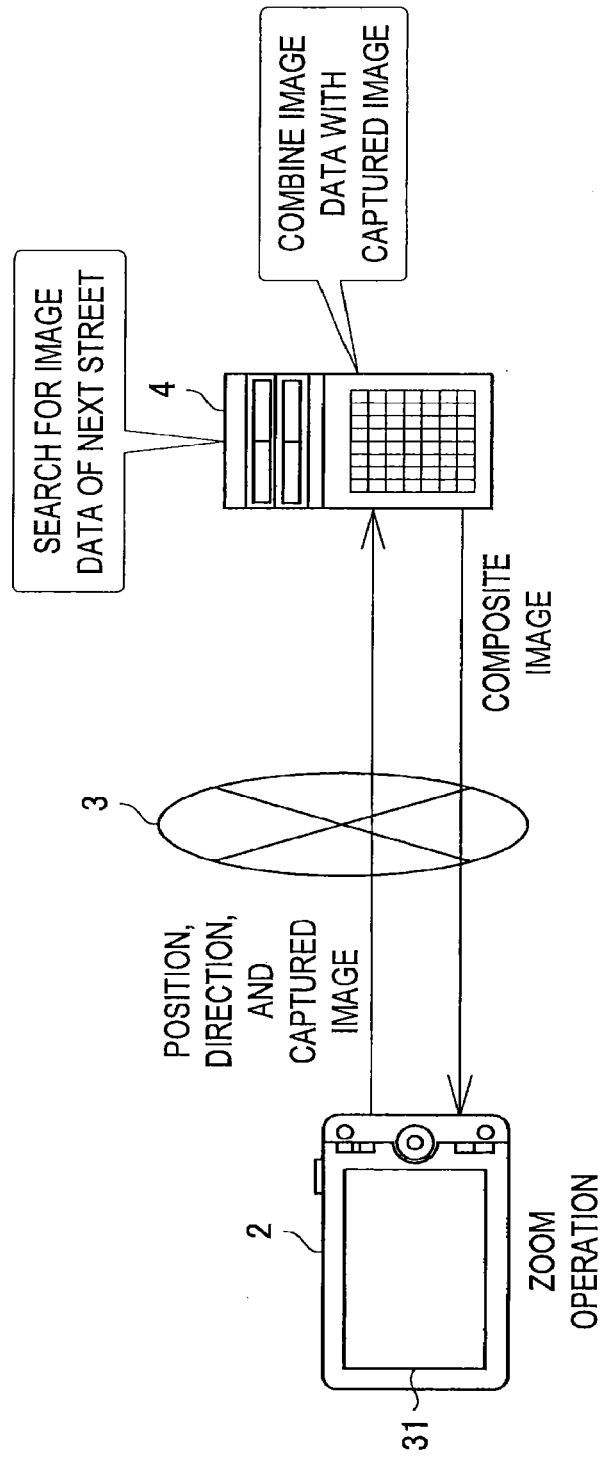
FIG. 11 is a diagram illustrating a skip zoom system in accordance with another embodiment of the present disclosure.

FIG. 11 is a diagram illustrating a skip zoom system in accordance with another embodiment of the present disclosure. As illustrated in FIG. 11, a digital camera 2 transmits position information, direction information, and a captured image to a server 4 via a network 3. The server 4 searches for image data of the next street, as in the above-described embodiment, based on the received position and direction information.

Subsequently, the server 4 in accordance with this embodiment combines the searched image data with the captured image received from the digital camera 2, and transmits a generated composite image to the digital camera 2. The digital camera 2 displays the received composite image on the display unit 31.

According to the above, in the skip zoom system in accordance with this embodiment, on the side of the server 4, a process of combining the searched image data with the captured image is performed. Here, a configuration of the server 4 in accordance with this embodiment will be described with reference to FIG. 12.

Figure 12:
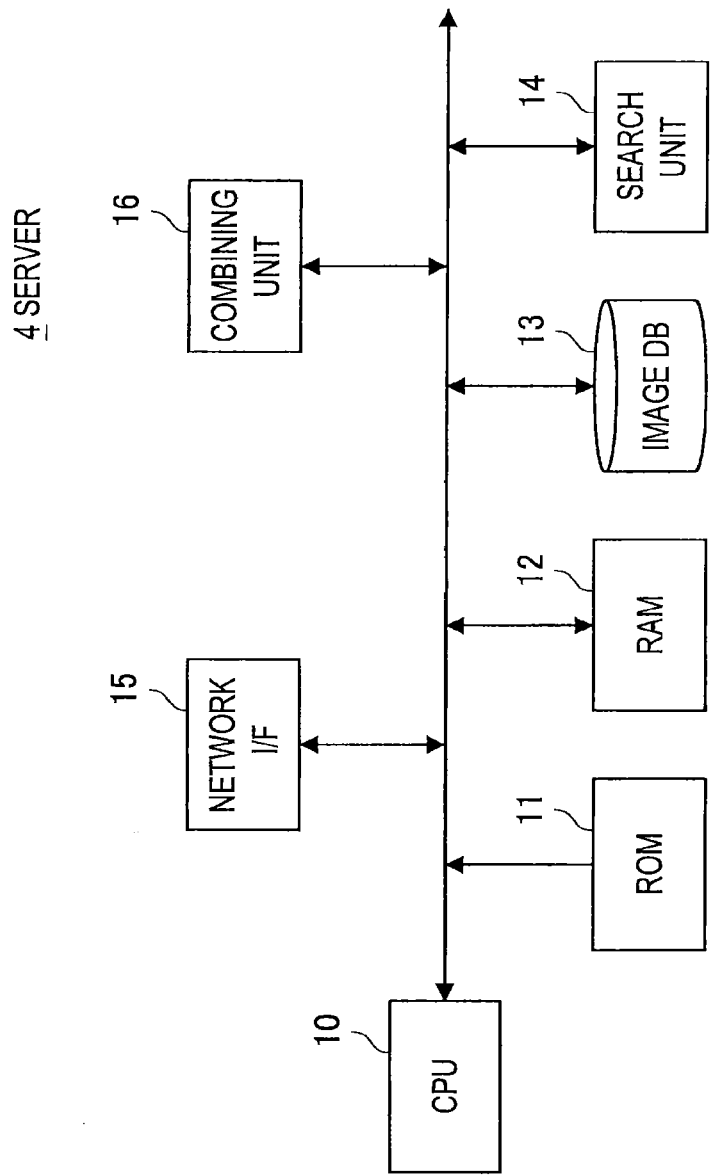
FIG. 12 is a block diagram illustrating a configuration of a server in accordance with another embodiment of the present disclosure.

FIG. 12 is a block diagram illustrating the configuration of the server 4 in accordance with this embodiment. As illustrated in FIG. 12, the server 4 in accordance with this embodiment includes a combining unit 16 in addition to the configuration of the server 1 illustrated in FIG. 2 in accordance with the above-described embodiment.

The combining unit 16 combines image data with position information indicating an opposite position across a target object in a direction in which the digital camera 2 is directed searched by the search unit 14 with a captured image received by a network I/F 15 from the digital camera 2, and generates a composite image.

Because a specific combining process by the combining unit 16 is substantially the same as a combining process by the display control unit 30 of the digital camera 2 described in "Display Example 1 of Skip Zoom" of the above-described <3. Display Control>, description thereof is omitted here.

<5. Summary>

As described above, the skip zoom system in accordance with this embodiment displays image data with position information indicating an opposite position across a target object in a direction in which a client terminal is directed according to a zoom operation. Thereby, the user can have a sense as if the user is close to (zooms-in on) a landscape on an opposite side by skipping a building or the like immediately ahead. In addition, because the user can view image data of a landscape, for example, a passageway, on an opposite side of a building or the like, when the user has lost his/her way or is looking for a peripheral shop, the user can check an appearance of the passageway without actually moving.

In addition, because the user can view a landscape visible from a current point in time if a building immediately ahead is transparent by displaying image data corresponding to a direction in which the digital camera 2 is directed, the user can intuitively recognize a spatial position.

It should be understood by those skilled in the art that various modifications, combinations, sub-combinations and alterations may occur depending on design requirements and other factors insofar as they are within the scope of the appended claims or the equivalents thereof.

For example, in the process illustrated in FIG. 6, before the process shown in step S118, the digital camera 2 acquires image data searched based on position information and direction information according to steps S103 to S115. However, the order of the process in accordance with this embodiment is not limited thereto. For example, when the zoom operation is determined to have been performed in step S118, the digital camera 2 may acquire the image data searched based on the position and direction information according to steps S103 to S115.

In addition, the search unit 14 in accordance with this embodiment may search for image data with position information indicating an opposite position across a plurality of target objects in a direction in which the digital camera 2 is directed such as image data of a street two or more streets away as well as image data of a street one street away. In this case, the digital camera 2 may control image data of a street one or two streets away to be displayed according to an operation amount of the skip zoom operation.

In addition, image data searched by the search unit 14 of the above-described server 1 is not limited to a still image, and may be, for example, a moving image. In addition, the digital camera 2 in accordance with this embodiment may also capture and record a moving image in addition to a still image.

In addition, although the digital camera 2 acquires image data from the server 1 in the above-described embodiment, an acquisition destination of image data in accordance with this embodiment is not limited to a specific server. The acquisition destination of the image data may be, for example, an unspecified number of servers or PCs on the Internet having functions of the image DB 13 and the search unit 14.

In addition, the configuration of the client terminal in accordance with this embodiment is not limited to the example illustrated in FIG. 5. For example, in addition to the configuration illustrated in FIG. 5, the client terminal in accordance with this embodiment may further have the image DB and the search unit. In this case, the client terminal can search for image data from a local image DB.

Additionally, the present technology may also be configured as below.

(1) A server including:
a reception unit configured to receive, from a client terminal, position information indicating a position of the client terminal, and direction information indicating a direction in which the client terminal is directed; and a search unit configured to search for image data provided with position information indicating an opposite position across a target object present in the direction indicated by the direction information with respect to the position of the client terminal based on the position information.

(2) The server according to (1), wherein the search unit searches for image data provided with position information indicating a position that is near an axis extending in the direction indicated by the direction information and is opposite across the target object present in the direction indicated by the direction information with respect to the client terminal, and direction information substantially identical to the direction information.

(3) The server according to (1) or (2), further including:
a combining unit configured to combine the image data searched by the search unit with an image captured by the client terminal in the direction indicated by the direction information; and
a transmission unit configured to transmit a composite image obtained through combining by the combining unit to the client terminal.

(4) The server according to (3), wherein the combining unit performs the combining in a manner that the target object shown in the captured image becomes transparent enough to cause the searched image data to be viewed, the searched image data being a landscape behind the target object.

(5) The server according to (1) or (2), further including:
a transmission unit configured to transmit the image data searched by the search unit to the client terminal.

(6) A client terminal including:
a transmission unit configured to transmit, to a server, position information indicating a position of the client terminal, and direction information indicating a direction in which the client terminal is directed; and
a reception unit configured to receive, from the server, image data provided with position information indicating an opposite position across a target object present in the direction indicated by the direction information with respect to the position of the client terminal based on the position information.

(7) The client terminal according to (6), wherein the reception unit receives, from the server, image data including position information indicating a position that is near an axis extending in the direction indicated by the direction information and is opposite across the target object present in the direction indicated by the direction information with respect to the client terminal, and direction information substantially identical to the direction information.

(8) The client terminal according to (7), further including:
a combining unit configured to combine the image data received by the reception unit with an image captured in the direction indicated by the direction information from the position of the client terminal; and
a display control unit configured to control display of a composite image obtained through combining by the combining unit.

(9) The client terminal according to (8), wherein the combining unit performs the combining in a manner that the target object shown in the captured image becomes transparent enough to cause the received image data to be viewed, the received image data being a landscape behind the target object.

(10) The client terminal according to (6) or (7), further including:
a display control unit configured to control display of the image data received by the reception unit.

(11) A system including:
an acquisition unit configured to acquire position information indicating a position of a client terminal, and direction information indicating a direction in which the client terminal is directed; and
a search unit configured to search for image data provided with position information indicating an opposite position across a target object present in the direction, which is indicated by the direction information, in which the client terminal is directed with respect to the position of the client terminal indicated by the position information.
(12) A recording medium that records a program for causing a computer to execute the processes of:
receiving, from a client terminal, position information indicating a position of the client terminal, and direction information indicating a direction in which the client terminal is directed; and
searching for image data provided with position information indicating an opposite position across a target object present in the direction indicated by the direction information with respect to the position of the client terminal based on the position information.
(13) A recording medium that records a program for causing a computer to execute the processes of:
transmitting, to a server, position information indicating a position of a client terminal, and direction information indicating a direction in which the client terminal is directed; and
receiving, from the server, image data provided with position information indicating an opposite position across a target object in the direction indicated by the direction information with respect to the position of the client terminal based on the position information.
(14) A recording medium that records a program for causing a computer to execute the processes of:
acquiring position information indicating a position of a client terminal, and direction information indicating a direction in which the client terminal is directed; and
searching for image data provided with position information indicating an opposite position across a target object present in the direction, which is indicated by the direction information, in which the client terminal is directed with respect to the position of the client terminal indicated by the position information.

The present disclosure contains subject matter related to that disclosed in Japanese Priority Patent Application JP 2012-025087 filed in the Japan Patent. Office on Feb. 8, 2012, the entire content of which is hereby incorporated by reference.

The invention claimed is:

1. A server, comprising:
circuitry configured to:
receive, from a terminal, first position information of the terminal and direction information of the terminal;
retrieve, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information; and
transmit the first image and the second image to the terminal.

2. The server according to claim 1, wherein the circuitry is further configured to:
combine the first image with the third image captured by the terminal in the direction indicated by the direction information to generate a composite image; and
transmit the composite image to the terminal.

3. The server according to claim 2, wherein the circuitry is further configured to combine the first image with the third image such that the first target object shown in the third image becomes transparent to cause the first image to be viewed, the first image being a first landscape behind the first target object and the second image being a second landscape behind the second target object.

4. The server according to claim 1, wherein the current situation information corresponds to the altitude at which the third image is captured by the terminal.

5. The server according to claim 1, wherein the current situation information corresponds to the imaging date on which the third image is captured by the terminal.

6. The server according to claim 1, wherein the current situation information corresponds to the imaging time band during which the third image is captured by the terminal.

7. The server according to claim 1, wherein the current situation information corresponds to the weather information associated with the third image captured by the terminal.

8. A terminal, comprising:
circuitry configured to:
transmit, to a server, first position information of the terminal and direction information of the terminal; and
receive from the server, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information.

9. The terminal according to claim 8, wherein the circuitry is further configured to:
combine the first image with the third image captured in the direction indicated by the direction information to generate a composite image, wherein the third image is captured by the terminal from a position that corresponds to the first position information of the terminal; and
control display of the composite image.

10. The terminal according to claim 9, wherein the circuitry is further configured to combine the first image with the third image such that the first target object shown in the third image becomes transparent to cause the first image to be viewed, the first image being a first landscape behind the first target object and the second image being a second landscape behind the second target object.

11. The terminal according to claim 8, wherein the circuitry is further configured to control display of the first image.

12. The terminal according to claim 8, wherein the circuitry is further configured to detect a position that corresponds to the first position information of the terminal and the direction in which the terminal is directed.

13. The terminal according to claim 8, wherein based on a lack of a captured image that is stored in association with the second position information, the circuitry is further configured to provide a notification through a display.

14. A system, comprising:
circuitry configured to:
acquire first position information of a terminal and direction information of the terminal;
retrieve, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information; and
transmit the first image and the second image to the terminal.

15. A non-transitory computer-readable medium having stored thereon, computer-executable instructions for causing a computer to execute operations, the operations comprising:
receiving, from a terminal, first position information of the terminal and direction information of the terminal;
retrieving, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information; and
transmitting the first image and the second image to the terminal.

16. A non-transitory computer-readable medium having stored thereon, computer-executable instructions for causing a computer to execute operations, the operations comprising:
transmitting, to a server, first position information of a terminal and direction information of the terminal;
receiving from the server, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information.

17. A non-transitory computer-readable medium having stored thereon, computer-executable instructions for causing a computer to execute operations, the operations comprising:
acquiring first position information of a terminal and direction information of the terminal;
retrieving, based on current situation information of the terminal, a first image corresponding to second position information indicating a first opposite position across a first target object present in a direction of the direction information and a second image corresponding to third position information indicating a second opposite position across a second target object present in the direction of the direction information, wherein the current situation information corresponds to one of an altitude, an imaging date, an imaging time band, or weather information associated with a third image captured by the terminal in the direction indicated by the direction information; and
transmitting the first image and the second image to the terminal.

* * * * *